US011027381B2

(12) United States Patent
Onushko et al.

(10) Patent No.: US 11,027,381 B2
(45) Date of Patent: Jun. 8, 2021

(54) PIPE ROTATOR ASSEMBLY

(71) Applicant: MILWAUKEE ELECTRIC TOOL CORPORATION, Brookfield, WI (US)

(72) Inventors: Walter A. Onushko, Greendale, WI (US); Michael J. Tuma, Waukesha, WI (US); Joseph J. Fulop, Hartford, WI (US); Daniel R. White, Hugo, MN (US); Kevin R. Gee, New Berlin, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 58 days.

(21) Appl. No.: 16/402,433

(22) Filed: May 3, 2019

(65) Prior Publication Data

US 2019/0337107 A1 Nov. 7, 2019

Related U.S. Application Data

(60) Provisional application No. 62/666,301, filed on May 3, 2018.

(51) Int. Cl.
*B23Q 3/06* (2006.01)
*B23B 5/16* (2006.01)
*B23Q 1/64* (2006.01)

(52) U.S. Cl.
CPC ............. *B23Q 3/064* (2013.01); *B23B 5/16* (2013.01); *B23Q 1/64* (2013.01); *B23B 5/167* (2013.01)

(58) Field of Classification Search
CPC ........... B23B 5/16; B23B 5/167; B23B 5/168; B23B 2260/116; B23B 2215/72; B23Q 1/64; B23Q 3/064; Y10T 82/2522; Y10T 82/16967
See application file for complete search history.

(56) References Cited

U.S. PATENT DOCUMENTS

| | | | | | |
|---|---|---|---|---|---|
| 3,572,199 | A | * | 3/1971 | Harden | B23D 45/12 82/101 |
| 3,807,260 | A | * | 4/1974 | Berdyansky | B23D 21/00 82/101 |
| 3,848,863 | A | * | 11/1974 | Owen | B23K 37/0538 269/9 |
| 3,850,058 | A | * | 11/1974 | Bachmann | B23D 21/00 82/101 |
| 3,985,051 | A | * | 10/1976 | Brown | B23B 5/168 82/101 |
| 4,412,401 | A | * | 11/1983 | Fundell | B23D 45/044 266/57 |

(Continued)

FOREIGN PATENT DOCUMENTS

EP 3132886 A1 * 2/2017 ........... B23K 31/027

*Primary Examiner* — Sara Addisu
(74) *Attorney, Agent, or Firm* — Michael Best & Friedrich LLP

(57) ABSTRACT

A pipe rotator assembly includes a frame upon which a cylindrical pipe is supportable, and a wheel rotatably coupled to the frame and engageable with the pipe for imparting rotation thereto in response to rotation of the wheel. The pipe rotator assembly additionally includes a drive shaft coupled to the wheel for transferring torque thereto, causing the wheel to rotate, and a drive unit for providing torque to the drive shaft. The drive unit includes an electric motor and an onboard power source for powering the motor.

19 Claims, 2 Drawing Sheets

(56) References Cited

U.S. PATENT DOCUMENTS

| | | | | | |
|---|---|---|---|---|---|
| 4,517,867 | A | * | 5/1985 | Fuminier | B23D 21/00 30/94 |
| 4,617,714 | A | * | 10/1986 | Kori | B23B 1/00 226/190 |
| 4,693,149 | A | * | 9/1987 | Sireix | B26D 3/16 82/53.1 |
| 4,776,248 | A | * | 10/1988 | Birkestrand | B23B 5/16 30/102 |
| 5,027,681 | A | * | 7/1991 | Hyvarinen | B23D 45/046 30/94 |
| 8,141,459 | B2 | * | 3/2012 | Myburgh | B25B 21/00 81/57 |
| 10,022,801 | B1 | * | 7/2018 | Devaney | B23B 5/08 |
| 2004/0163512 | A1 | * | 8/2004 | Quigley | B26D 3/161 83/27 |
| 2005/0022353 | A1 | * | 2/2005 | Viola | B23B 31/202 29/412 |
| 2015/0090082 | A1 | * | 4/2015 | Conrad | B26D 3/06 82/46 |
| 2019/0329335 | A1 | * | 10/2019 | Xu | B26D 3/169 |

* cited by examiner

PIPE ROTATOR ASSEMBLY

CROSS-REFERENCE TO RELATED APPLICATIONS

This application claims priority to U.S. Provisional Patent Application No. 62/666,301 filed on May 3, 2018, the entire contents of both of which are incorporated herein by reference.

FIELD OF THE INVENTION

The present invention relates to power tools, and more particularly to a pipe rotator assembly for supporting a pipe.

BACKGROUND OF THE INVENTION

Pipe rotator assemblies are used to support a pipe during various cutting and/or beveling operations. Traditional beveling operations require a user to rotate a pipe beveling tool around the end of the pipe.

SUMMARY OF THE INVENTION

The present invention provides, in one aspect, a pipe rotator assembly comprising a frame upon which a cylindrical pipe is supportable, a wheel rotatably coupled to the frame and engageable with the pipe for imparting rotation thereto in response to rotation of the wheel, a drive shaft coupled to the wheel for transferring torque thereto, causing the wheel to rotate, and a drive unit for providing torque to the drive shaft. The drive unit comprises an electric motor and an onboard power source for powering the motor.

The present invention provides, in another aspect, a pipe rotator assembly comprising a frame upon which a cylindrical pipe is supportable, a first wheel and a second wheel rotatably coupled to the frame and engageable with the pipe for imparting rotation thereto in response to rotation of the first and second wheels, and a gearbox including an input shaft and an output shaft. The output shaft is coupled to the first wheel for transferring torque thereto, causing the first wheel to rotate. The pipe rotator assembly also includes a drive unit for providing torque to the output shaft. The drive unit includes an electric motor and an onboard power source for powering the motor. The drive unit provides a first rotational speed to the input shaft and the gearbox provides a second rotational speed to the output shaft, in which the first rotational speed is greater than the second rotational speed.

The present invention provides, in another aspect, method of supporting a pipe during a pipe beveling operation. The method includes positioning a first end of the pipe within a cradle of a pipe rotator assembly and activating a drive unit, thereby causing the drive unit to impart torque a wheel on the cradle upon which the pipe is supported, thereby causing the wheel and the pipe to rotate.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
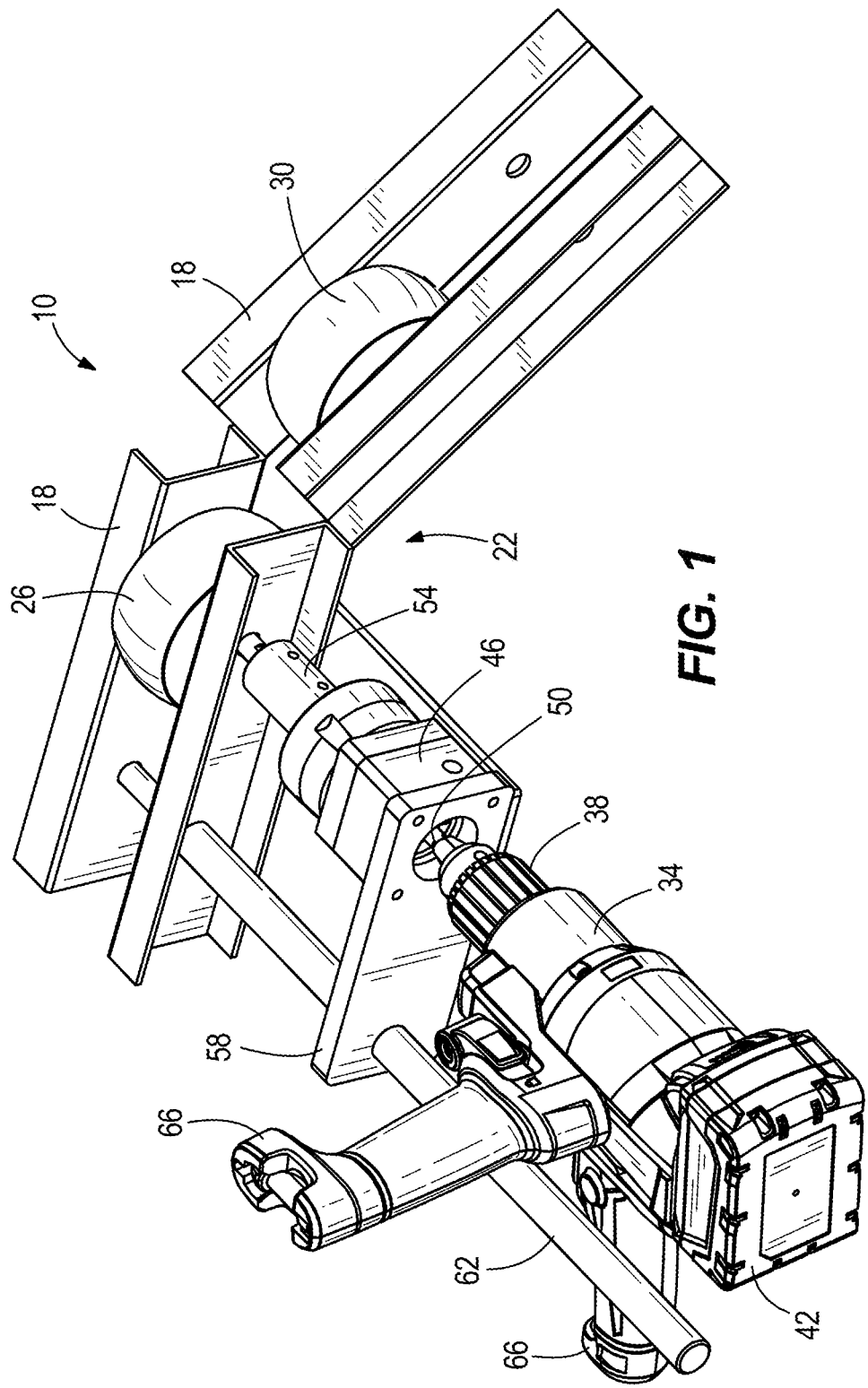
FIG. 1 is a rear perspective view of a pipe rotator assembly in accordance with an embodiment of the invention
Figure 2:
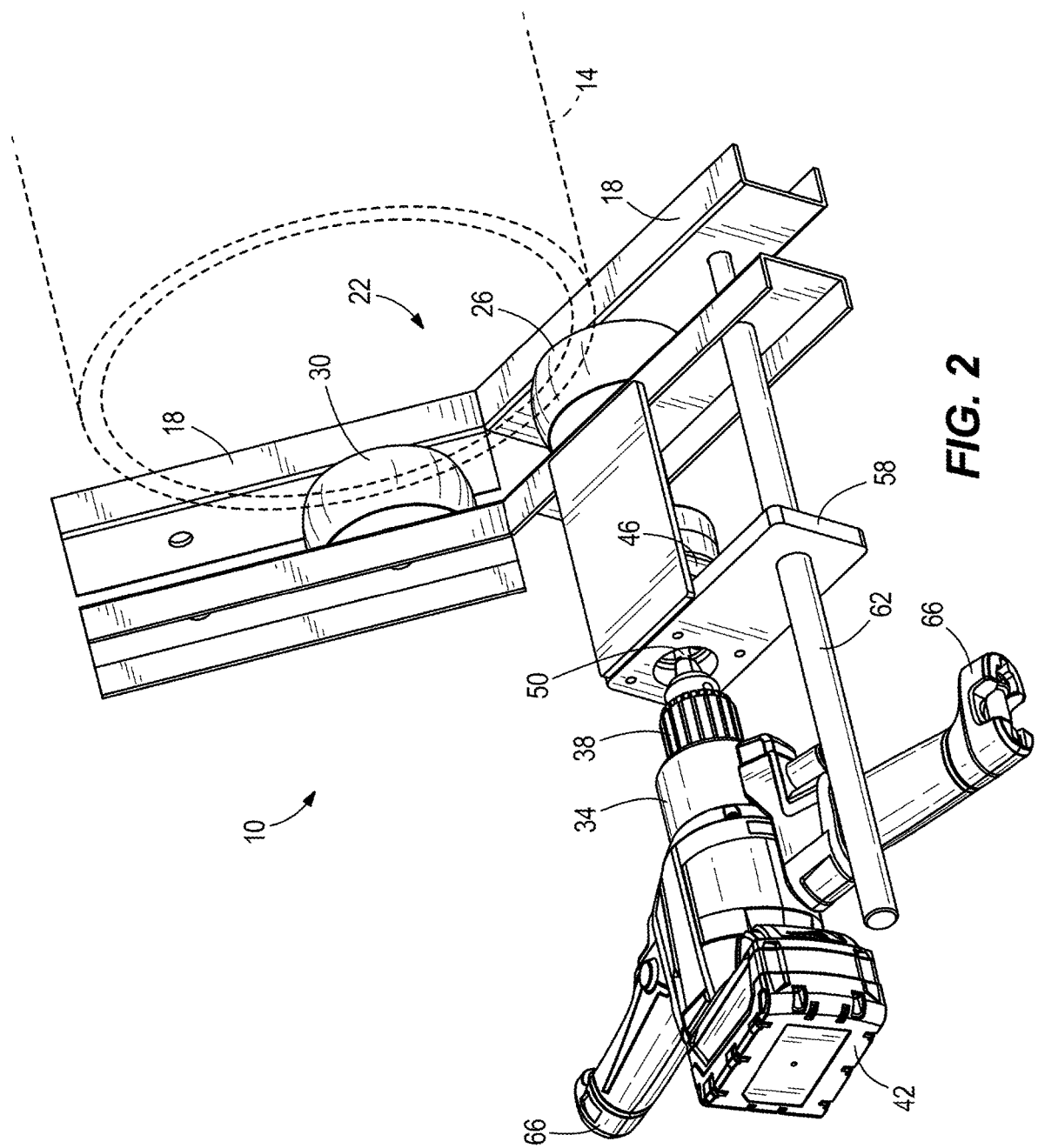
FIG. 2 is a rear perspective view of the pipe rotator assembly of FIG. 1 with a pipe supported thereon.

FIGS. 1 and 2 illustrate a pipe rotator assembly 10 for supporting a pipe 14 during a beveling operation on one end of the pipe 14. Instead of the user rotating a pipe beveling tool (not shown) around the end of a stationary pipe, the pipe rotator assembly 10 rotates the pipe 14 relative to the pipe beveling tool, permitting the user to hold the beveling tool stationary during a pipe beveling operation.

The pipe rotator assembly 10 includes a frame 18 upon which the pipe 14 is supportable. As shown in FIG. 1, the frame 18 is V-shaped, thereby defining a cradle 22 in which the pipe 14 is supportable. Although not shown, the frame 18 may include a clamp for securing the assembly 10 to a pipe fitting stand (also not shown). The assembly 10 also includes a driven wheel 26 and an idler wheel 30, each of which is rotatably coupled to the frame 18 on opposite sides of the cradle 22. Each of the wheels 26, 30 protrudes above the frame 18 so that the pipe 14 rests directly upon the wheels 26, 30 when placed in the cradle 22. Alternatively, the idler wheel 30 may be omitted, thereby allowing the pipe 14 to rest directly upon the frame 18 and the driven wheel 26 during a beveling operation.

With reference to FIGS. 1 and 2, the assembly 10 further includes a drive unit 34 for providing torque to the driven wheel 26, causing it and the pipe 14 to rotate relative to the frame 18. The drive unit 34 includes an electric motor (e.g., a brushless DC motor), a chuck 38 drivably coupled to the motor, and a selectively removable, onboard power source (e.g., a rechargeable power tool battery pack 42). The assembly 10 also includes a gearbox 46 (FIG. 1) having an input shaft 50 to which the chuck 38 is attached and an output shaft 54 attached for co-rotation with the driven wheel 26. The gearbox 46 is speed reducing, thereby providing a lower rotational speed to the output shaft 54 than the rotational speed provided to the input shaft 50 by the drive unit 34.

With continued reference to FIG. 1, the assembly 10 further includes a mounting plate 58 to which the front of the gearbox 46 is attached and a cylindrical stop rod 62 extending between and interconnecting the mounting plate 58 and the frame 18. The stop rod 62 extends rearward past the mounting plate 58 a sufficient distance to be capable of contact with one or more handles 66 of the drive unit 34. The stop rod 62 does not directly support the drive unit 34, however. Rather, the drive unit 34 is supported on the frame 18 via the gearbox 46, the mounting plate 58, and the stop rod 62. As such, the drive unit 34 is removable from the remainder of the assembly 10 by releasing the chuck 38 from the input shaft 50 of the gearbox 46. Alternatively, the drive unit 34 may be integral and non-removable component of the assembly 10.

Prior to a pipe beveling operation, the assembly 10 may be attached to a pipe fitting stand by a clamp (not shown). Then, the end of the pipe 14 to be beveled is laid within the cradle 22, resting directly upon the driven and idler wheels 26, 30. The opposite end of the pipe 14 may be supported upon another pipe fitting stand, another type of material-handling stand, or held by one or more individuals. The drive unit 34 is then activated (e.g., by depressing a motor activation trigger). If neither of the handles 66 is initially in contact with the stop rod 62 upon initial activation of the drive unit 34, the drive unit 34 will rotate relative to the input shaft 50 until one of the handles 66 contacts the stop rod 62. Thereafter, the drive unit 34 imparts torque to the input shaft 50, which is transferred by the gearbox 46 to the driven wheel 26, causing it to rotate relative to the frame 18. As such, the stop rod 62 imparts a reaction torque on the drive unit 34, thereby permitting the drive unit 34 to provide torque to the input shat 50 and the output shaft 54 for rotating the wheel 26. Because the outer periphery of the pipe 14 is in non-sliding contact with the driven wheel 26, rotation is also imparted to the pipe 14 in an opposite direction as the driven wheel 26. Thereafter, the user may perform a beveling operation on the pipe 14 as it is rotating, while holding the pipe beveling tool stationary.

Various features of the invention are set forth in the following claims.

What is claimed is:

1. A pipe rotator assembly comprising:
   a frame upon which a cylindrical pipe is supportable;
   a wheel rotatably coupled to the frame and engageable with the pipe for imparting rotation thereto in response to rotation of the wheel;
   a drive shaft coupled to the wheel for transferring torque thereto, causing the wheel to rotate; and
   a drive unit for providing torque to the drive shaft, wherein the drive unit includes an electric motor and an onboard power source for powering the motor, and wherein the drive unit further includes a chuck drivably coupled to the motor.

2. The pipe rotator assembly of claim 1, further comprising a gearbox including an input shaft and the drive shaft.

3. The pipe rotator assembly of claim 2, wherein the drive unit provides a first rotational speed to the input shaft, and the gearbox provides a second rotational speed to the drive shaft.

4. The pipe rotator assembly of claim 3, wherein the first rotational speed is greater than the second rotational speed.

5. The pipe rotator assembly of claim 2, further comprising a mounting plate coupled to the gearbox, and a rod positioned between the mounting plate and the frame.

6. The pipe rotator assembly of claim 5, wherein the gearbox, the mounting plate, and the rod support the drive unit on the frame, and wherein the rod is engageable with a portion of the drive unit to impart a reaction torque on the drive unit, thereby permitting the drive unit to provide torque to the output shaft for rotating the wheel.

7. The pipe rotator assembly of claim 1, wherein the chuck removably couples the drive unit to the remainder of the pipe rotator assembly.

8. The pipe rotator assembly of claim 1, wherein the wheel is a first wheel, and wherein the pipe rotator assembly further comprises a second wheel rotatably coupled to the frame upon which the pipe is supportable.

9. The pipe rotator assembly of claim 8, wherein the first wheel is a driven wheel and the second wheel is an idler wheel.

10. The pipe rotator assembly of claim 1, wherein the onboard power source is a rechargeable power tool battery pack.

11. A pipe rotator assembly comprising:
    a frame upon which a cylindrical pipe is supportable;
    a first wheel and a second wheel rotatably coupled to the frame and engageable with the pipe for imparting rotation thereto in response to rotation of the first and second wheels;
    a gearbox including an input shaft and an output shaft, wherein the output shaft is coupled to the first wheel for transferring torque thereto, causing the first wheel to rotate; and
    a drive unit for providing torque to the output shaft, wherein the drive unit includes an electric motor and an onboard power source for powering the motor, and wherein the drive unit includes a chuck drivably coupled to the motor;
    wherein the drive unit provides a first rotational speed to the input shaft and the gearbox provides a second rotational speed to the output shaft, and wherein the first rotational speed is greater than the second rotational speed.

12. The pipe rotator assembly of claim 11, wherein the first wheel is a driven wheel and the second wheel is an idler wheel.

13. The pipe rotator assembly of claim 11, wherein the chuck removably couples the drive unit to the input shaft of the gearbox.

14. The pipe rotator assembly of claim 11, wherein the onboard power source is a rechargeable power tool battery pack.

15. The pipe rotator assembly of claim 11, further comprising a mounting plate coupled to the gearbox, and a rod positioned between the mounting plate and the frame.

16. The pipe rotator assembly of claim 15, wherein drive unit is supported on the frame via the gearbox, the mounting plate, and the rod, and wherein the rod is engageable with a portion of the drive unit to impart a reaction torque on the drive unit, thereby permitting the drive unit to provide torque to the output shaft for rotating the first wheel.

17. A method of supporting a pipe during a pipe beveling operation, the method comprising:
    positioning a first end of the pipe within a cradle of a pipe rotator assembly;
    connecting a chuck of a drive unit to a shaft of the pipe rotator assembly, wherein the chuck is drivably coupled to a motor of the drive unit; and
    activating the drive unit, thereby causing the drive unit to impart torque to the shaft and a wheel on the cradle upon which the pipe is supported, thereby causing the wheel and the pipe to rotate.

18. The method of claim 17, further comprising imparting a reaction torque to the drive unit with a rod affixed to the cradle, thereby permitting the drive unit to provide torque to the wheel, causing it to rotate.

19. The method of claim 17, wherein the wheel is a first wheel, and wherein positioning the first end of the pipe on the cradle includes positioning the first end of the pipe upon the first wheel and a second, non-driven wheel.

* * * * *